United States Patent
Mimoune

(10) Patent No.: US 8,498,031 B2
(45) Date of Patent: Jul. 30, 2013

(54) CORRECTION OF WHITE BALANCE DEVIATION IN A CAPTURED IMAGE

(75) Inventor: Reda Mimoune, Grenoble (FR)

(73) Assignee: STMicroelectronics SA, Montrouge (FR)

( * ) Notice: Subject to any disclaimer, the term of this patent is extended or adjusted under 35 U.S.C. 154(b) by 934 days.

(21) Appl. No.: 12/579,822

(22) Filed: Oct. 15, 2009

(65) Prior Publication Data

US 2010/0182660 A1    Jul. 22, 2010

(30) Foreign Application Priority Data

Oct. 15, 2008   (FR) ...................................... 08 57004

(51) Int. Cl.
*H04N 1/46*   (2006.01)

(52) U.S. Cl.
USPC ........... 358/516; 358/518; 358/504; 382/274; 396/429

(58) Field of Classification Search
USPC ................. 358/512, 514, 516, 504, 505, 509, 358/518; 382/274; 396/429
See application file for complete search history.

(56) References Cited

U.S. PATENT DOCUMENTS

| | | | |
|---|---|---|---|
| 6,876,384 B1 * | 4/2005 | Hubina et al. | 348/223.1 |
| 7,711,257 B2 * | 5/2010 | Tamminen et al. | 396/67 |
| 2004/0120575 A1 | 6/2004 | Cheng | |
| 2005/0134702 A1 | 6/2005 | Subbotin | |
| 2005/0213128 A1 | 9/2005 | Imai et al. | |
| 2007/0085916 A1 | 4/2007 | Nishio | |
| 2007/0133868 A1 | 6/2007 | Hu | |
| 2008/0292184 A1 * | 11/2008 | Park et al. | 382/168 |

OTHER PUBLICATIONS

International Search Report for FR0857004 dated May 19, 2009.

* cited by examiner

*Primary Examiner* — King Poon
*Assistant Examiner* — Jamares Q Washington
(74) *Attorney, Agent, or Firm* — Fleit Gibbons Gutman Bongini & Bianco P.L.

(57) ABSTRACT

A method is provided for correcting an image. At least some pixels in a captured image are scanned and there is selected each scanned pixel having at least one associated light intensity value greater than an intensity threshold value based on a comparison between the light intensity values for color indicators associated with the scanned pixel. Three correction information items are obtained by summing the light intensity values associated with the pixels selected by color indicator, and a correction of the white balance deviation affecting the captured image is determined based on the correction information items. A pixel is selected if both the difference between a mean light intensity value and a lowest light intensity value associated with the scanned pixel and the difference between a highest light intensity value and the mean light intensity value associated with the scanned pixel are less than a difference threshold value.

20 Claims, 4 Drawing Sheets

| G | R | G | R | G | R | G | R |
|---|---|---|---|---|---|---|---|
| B | G | B | G | B | G | B | G |
| G | R | G | R | G | R | G | R |
| B | G | B | G | B | G | B | G |
| G | R | G | R | G | R | G | R |
| B | G | B | G | B | G | B | G |
| G | R | G | R | G | R | G | R |
| B | G | B | G | B | G | B | G |

FIG. 2.

CORRECTION OF WHITE BALANCE DEVIATION IN A CAPTURED IMAGE

CROSS-REFERENCE TO RELATED APPLICATIONS

This application is based upon and claims priority from French Patent Application No. 08 57004, filed Oct. 15, 2008, the entire disclosure of which is herein incorporated by reference.

FIELD OF THE INVENTION

This present invention relates to image processing, and more specifically to the correction of white balance deviation which can affect captured images.

BACKGROUND OF THE INVENTION

The color of the light reflected by an object depends on the color of the light source illuminating it. The human brain is capable of adapting to color changes in light, so that a white object, for example, is perceived as white even if the light source is emitting light affected by a dominant color.

This is not the case when an image of the object is captured by an image sensor, such as a video camera or still camera. Depending on the light, a white object may then appear tinted.

To avoid this distortion to the color of the object, the captured image can undergo digital processing intended to restore the original color of the object represented in the image. This type of digital processing is conventionally called "white balance correction." There are known white balance correction algorithms, such as the Gray World Assumption algorithm described in the document 'A spatial processor model for object color perception' by Buchsbaum, G., Journal of the Franklin Institute 310(1) (1980) 337-350, or in the document 'An Introduction to Color, John Wiley & Sons' by Evans, R. M., New York, 1948. An algorithm of this type is based on a theory in which an image is generally gray in color, or more specifically, in which the sum of the colors red (R), green (G), and blue (B) of a captured image corresponds to the color gray.

White balance correction is then determined on the basis of information concerning the red green and blue colors for a given image. To determine whether an image is affected with white balance deviation, the image is checked to see whether it is generally gray in color. If this is the case, no white balance correction is applied. Otherwise a correction to be applied to the captured image is determined.

However, an algorithm of this type can yield inappropriate image correction in certain cases, particularly when the image in question is of an object which is monochromatic. The average color of the captured image may not be the color gray in this case, but there is no need to correct a white balance deviation. By applying such a correction algorithm in this case, a white balance deviation is corrected which does not exist.

Conversely, when applying this type of image correction algorithm, it is possible that a white balance deviation in the image is not corrected when it would be advantageous to do so. Such can be the case when the average color of the captured image is gray although certain areas of the image have a white balance deviation.

SUMMARY OF THE INVENTION

One embodiment of the present invention provides a method for correcting an image captured by an image sensor. The captured image comprises pixels, and each of the pixels are associated with first, second, and third color indicators and with light intensity values for each of the color indicators. According to the method, at least a part of the pixels in the captured image are scanned and there is selected each scanned pixel having at least one associated light intensity value greater than an intensity threshold value, on the basis of a comparison between the light intensity values for the respective color indicators associated with the scanned pixel. First, second, and third correction information items are obtained by summing the light intensity values associated with the pixels respectively selected by color indicator, and a correction of the white balance deviation affecting the captured image is determined on the basis of the first, second, and third correction information items. In the scanning, a pixel is selected if the difference between a mean light intensity value and a lowest light intensity value associated with the scanned pixel is less than a difference threshold value, and the difference between a highest light intensity value and the mean light intensity value associated with the scanned pixel is less than the difference threshold value.

Another embodiment of the present invention provides a correction device for an image captured by an image sensor. The image comprises pixels, and each of the pixels are associated with first, second, and third color indicators and with light intensity values for each of the color indicators. The correction device includes a pixel selection unit, an information obtaining unit, and a correction unit. The pixel selection unit is adapted to scan at least a part of the pixels of the captured image and to select each scanned pixel having at least one associated light intensity value greater than an intensity threshold value, based on a comparison between the light intensity values for the respective color indicators associated with the scanned pixel. The information obtaining unit is adapted to obtain first, second, and third correction information items by summing the light intensity values associated with the pixels respectively selected by color indicator, and the correction unit is adapted to determine a correction of the white balance deviation affecting the captured image, on the basis of the first, second, and third correction information items. The pixel selection unit selects a pixel if the difference between a mean light intensity value and a lowest light intensity value associated with the scanned pixel is less than a difference threshold value, and the difference between a highest light intensity value and the mean light intensity value associated with the scanned pixel is less than the difference threshold value.

Other objects, features, and advantages of the present invention will become apparent from the following detailed description. It should be understood, however, that the detailed description and specific examples, while indicating preferred embodiments of the present invention, are given by way of illustration only and various modifications may naturally be performed without deviating from the present invention.

BRIEF DESCRIPTION OF THE DRAWINGS

FIG. 2 illustrates the pixels of this image after applying a Bayer filter.

DETAILED DESCRIPTION

Figure 1:
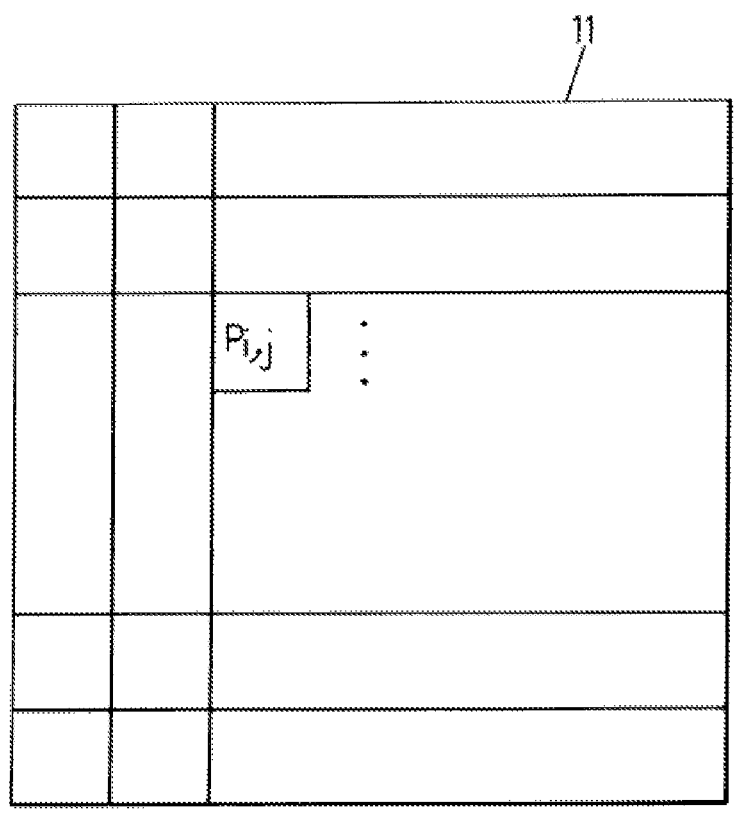
FIG. 1 illustrates the pixels of a captured image.

A first aspect of the present invention provides a process for correcting an image captured by an image sensor, the captured image comprising a plurality of pixels, each of the pixels being associated with at least one color indicator from among a first, a second, and a third color indicator, and with a light intensity value for the at least one color indicator.

The process includes scanning at least a part of the pixels in the captured image and selecting each scanned pixel having at least one associated light intensity value greater than an intensity threshold value, on the basis of a comparison of at least one color indicator associated with the scanned pixel and at least one other color indicator associated with at least one pixel from among at least one neighboring pixel of the scanned pixel and the scanned pixel; obtaining a first, a second, and a third correction information item by summing the light intensity values associated with the pixels respectively selected by color indicator; and determining a correction of the white balance deviation affecting the captured image, on the basis of the first, second, and third correction information items.

To correct a white balance deviation in an appropriate manner, in one embodiment of the present invention the various neutral, or rather pseudo-neutral, zone(s) of an image are taken into account, meaning the zones which are of a color close to white. More specifically, pixels in these neutral zones of the image are selected on the basis of certain neutrality criteria, and then a correction information item can be obtained by color. Next, by applying any method known to a person skilled in the art, the three correction information items are processed to obtain a correction of white balance deviation in this image if such exists. Such a correction method can be based on a variation in the gain applied to the three channels for the different colors, which makes use of relations between the colors red and green and the colors blue and green as is described in the document "Micrometrics Imaging Guide" from Scientific Instrument Software Corporation Limited.

Through these measures, unlike prior art methods which are based on the set of all color indicators associated with the pixels of the captured image, it is possible to obtain correction information which is relevant because it comes from pseudo-neutral zones of the image, and it is then easier to detect a white balance deviation in an image under such conditions.

Such a process is easy to implement and does not require a significant amount of hardware resources.

In one embodiment of the present invention, each of the pixels is associated with a color indicator and a light intensity value for the color indicator, and in the scanning step, the pixels are selected further on the basis of a comparison of the color indicator associated with the scanned pixel and the color indicators respectively associated with a number N of neighboring pixels of the pixel, where N is a whole number between 2 and 8.

Such a captured image, comprising a plurality of pixels each being associated with a color indicator and a light intensity value for that color, can in particular be obtained by applying a Bayer filter to a digitally captured image.

The Bayer filter allows creating an array of pixels with respectively associated color indicators. This occurs according to a given pattern in which, generally, the total number of green pixels is equal to the total number of red and blue pixels combined.

By applying such a filter, an image is obtained which comprises pixels which are each associated with the color red, or the color blue, or the color green, with different respective light intensities. From such an image structure, it is then possible to determine one or more pseudo-neutral zones in the captured image, meaning zones that are white or gray. A deviation from the original color is most visible in such pseudo-neutral zones of a captured image.

In one embodiment of the present invention, a scanned pixel is selected if it has at least two neighboring pixels having respectively associated color indicators which are both different from each other and different from the color indicated by the color indicator associated with the pixel.

By taking this pixel selection criterion into account when determining an image correction, a certain level of color neutrality is guaranteed in the zone where the selected pixel is located. Only pixels are selected which are surrounded by at least two pixels of a color different from each other and different from the color of the scanned pixel. Consequently, there is at least one green pixel, one red pixel, and one blue pixel in this zone.

A scanned pixel can be selected if the difference between the light intensity values associated with the at least two neighboring pixels and the light intensity value associated with the scanned pixel is less than a difference threshold value.

By adding this pixel selection criterion, it is guaranteed that the light intensity associated with the at least three pixels of three different colors is substantially the same. This better guarantees a certain color neutrality in the zone of the image in which the scanned pixel is located, because not only are at least three pixels of three different colors, these three pixels also have similar light intensities.

The more the difference threshold value is increased, the more likely it is that a large number of pixels are selected in a captured image according to an embodiment. Advantageously, this difference threshold value can be modified as a function of the number of pixels selected or as a function of the number of pixels one wants to select.

In order to adjust the number of pixels selected, one can also modify the intensity threshold value and/or the number N of neighboring pixels as a function of the number of pixels selected, in a dynamic manner for example.

It is also possible to apply a correction process according to an embodiment of the present invention in the context of a captured image in which each pixels has its associated three colors red green blue and their respective light intensity values.

It can therefore be arranged that each of the pixels is associated with first, second, and third color indicators and with light intensity values for the respective color indicators, and that, in the scanning step, the pixels are selected further on the basis of a comparison between the light intensity values for the respective color indicators, associated with the scanned pixel.

In this context, it can be arranged that the selection of a pixel is based on the fact that three light intensity values are associated with it, all greater than the intensity threshold value, and additionally that, among these three light intensity values, the difference between the highest intensity value and the intermediate intensity value is below a difference threshold value and the difference between the intermediate intensity value and the lowest intensity value is below this difference threshold value. If the three light intensity values associated with the scanned pixel meet these conditions, the scanned pixel is then selected.

A second aspect of the present invention provides an image correction device adapted to implement a correction process according to the first aspect of the present invention.

A third aspect of the present invention provides a camera comprising a correction device according to the second aspect of the present invention, adapted to correct an image captured by the apparatus.

A fourth aspect of the present invention provides a mobile telephone comprising a camera according to the third aspect of the present invention.

A fifth aspect of the present invention provides a computer program for installation in an image correction device according to the second aspect of the present invention, comprising instructions for implementing the process according to the first aspect of the present invention, during execution of the program by the processing means of the correction device. The computer program can be stored on a tangible computer readable storage medium.

Exemplary embodiments of the present invention will now be described in detail with reference to FIGS. 1-5.

One objective of the present invention is to correct a white balance deviation which can affect one or more parts of a captured image, with the white balance deviation possibly being due to the light illuminating certain objects in the scene represented in the image.

More specifically, instead of taking into account the entire image in order to determine a correction to apply to the captured image, here it is proposed to take into account the parts of the image which correspond to pseudo-neutral zones of the image, meaning sets of pixels of the captured image which are substantially gray in color.

In the illustration that follows, the present invention is described as it applies to captured images filtered by a Bayer filter. Such an application is non-limiting. One can easily implement a correction process, according to an embodiment of the present invention, for a captured image in which each pixel has its associated three colors red, green, blue and their respective light intensity values. In such case, when selecting pixels in the image, instead of taking into consideration the characteristics (such as color indicator and light intensity value) associated with the neighboring pixels of the scanned pixel, as is proposed for a Bayer type captured image, the pixel selection can be based solely on the characteristics associated with the pixel, because in this case the characteristics associated with each pixel concern the three colors red green blue and therefore in themselves allow determining a pseudo-neutral zone in the image. For such a selection, one can for example select the pixels for which the three light intensity values are greater than the intensity threshold value, but only if the difference between the mean light intensity value and the lowest light intensity value and the difference between the highest light intensity value and the mean light intensity value are less than a difference threshold value, such that the pixels in the pseudo-neutral zones of the image are selected.

It is also easy to apply a correction process according to an embodiment of the present invention which only takes into account two color indicators and their two respective light intensity values associated with the pixels of the image.

FIG. 1 illustrates a captured image which is composed of a plurality of pixels $P_{i,j}$, where i is between 1 and N and j is between 1 and M, with M and N being whole numbers. Each of these pixels is associated with a gray level and a light intensity. A gray level corresponds to the respective levels for the three colors red, green and blue.

FIG. 2 illustrates the same captured image after application of a Bayer filter. By applying such a filter, an image is obtained of pixels that have associated characteristics corresponding to a light intensity value and to a unique color indicator indicating either the color red, or the color green, or the color blue.

Figure 3:
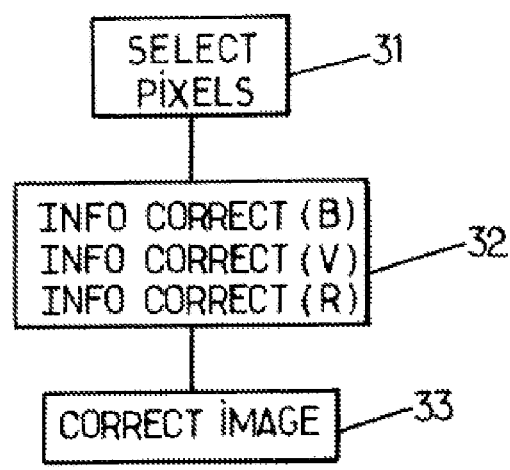
FIG. 3 illustrates a process according to an embodiment of the present invention.

FIG. 3 illustrates a correction process according to an embodiment of the present invention as it applies to captured Bayer images.

In a step 31, pixels are selected from the pixels of a captured image such as the one illustrated in FIG. 2. This selection is made on the basis of neutrality criteria, such that a pixel is selected when it is located within a pseudo-neutral zone according to an embodiment of the present invention.

In the context of captured Bayer images, two types of neutrality criteria are used for the selection of a pixel. A first type of criterion concerns the light intensity value which is associated with this pixel and which corresponds to the color indicator of the considered pixel, and a second type of criterion concerns a comparison between the intensity value associated with the considered pixel and the intensity values respectively associated with the neighboring pixels of the considered pixel.

It is easy to transpose such a process to other captured images, for example images in which each pixel is associated with the three colors blue green red and their respective intensities.

More specifically, in one embodiment of the present invention, only those pixels are selected which have a light intensity value greater than a light intensity threshold value. By proceeding in this manner, advantageously only pixels are selected which are relatively luminous, which allows basing the selection on more relevant information than if the characteristics of less luminous pixels are also taken into account.

It can be arranged to scan all the pixels of a captured image or only a part of the pixels of the captured image. During the step of scanning of at least a part of the pixels of the captured image, for each pixel which has a light intensity value greater than the corresponding threshold value, it is then determined whether it is part of a pseudo-neutral zone as defined in one embodiment of the present invention.

For this purpose, it is possible to take into consideration the characteristics associated with neighboring pixels of the considered pixel and compare them with the characteristics of the considered pixel.

In one embodiment, this considered pixel, which therefore has a light intensity value greater than the intensity threshold value, is considered to belong to a pseudo-neutral zone, or to be a "pseudo-neutral pixel":

if the three distinct color indicators red-green-blue are respectively associated with the pixels of a set of pixels comprising the considered pixel and at least two neighboring pixels of the pixel; and if the light intensity values associated with the at least two neighboring pixels are relatively close to the light intensity value associated with the considered pixel.

Thus, when at least two pixels in the neighborhood of a considered pixel of the captured image are associated with color indicators which are different from each other and different from the color indicator associated with the considered pixel, and these two pixels are of a light intensity close to that of the considered pixel, then this considered pixel is considered to be a pseudo-neutral pixel, or to be located in a pseudo neutral zone.

For example, a scanned pixel can only be selected if the difference between the light intensity values associated with the at least two neighboring pixels and the light intensity value associated with the scanned pixel is less than a difference threshold value.

The difference threshold value can be expressed as a percentage. In particular, one can decide that two light intensity values associated with two different pixels are close when these two light intensity values are separated by a percentage less than a percentage threshold, which can for example be equal to 10%. In this case, it is checked whether the at least two neighboring pixels of the considered pixel have light intensity values $I_{neighboring\text{-}pixel}$ which satisfy the following inequality.

$$I_{considered\text{-}pixel}(1-10\%) < I_{neighboring\text{-}pixel} < I_{considered\text{-}pixel}(1+10\%)$$

If the above conditions are met, it is selected for subsequent processing of its associated characteristics.

By scanning in this manner all or part of the pixels in the captured and filtered image, one is able to select the most relevant pixels, meaning those which have characteristics applicable to deciding and determining a correction of the captured image. With these measures, only the bright pixels located in a pseudo-neutral zone are selected.

The number of neighboring pixels to take into consideration in such a selection step is a whole number between 2 and 8. It can advantageously be adapted to the type of image to be processed. In addition, it can be dynamically decided to modify the value of this number N during the application of such an image correction process. Such may be the case in particular when there are too few pixels selected under the criteria used. It can then be decided to increase the number of neighboring pixels N taken into consideration.

In a step 32, using the pixels so selected, three correction information items will be determined: a first correction information item for the color blue, a second correction information item for the color green, and a third correction information item for the color red.

More specifically, in this step the light intensity values associated with the selected pixels are summed by color. Thus, the first correction information item can correspond to the sum of the light intensity values associated with all the selected pixels which have a blue color indicator; the second correction information item can correspond to the sum of the light intensity values associated with all the selected pixels which have a green color indicator; and the third correction information item can correspond to the sum of the light intensity values associated with all the selected pixels which have a red color indicator.

In this manner three relevant correction information items are easily obtained which can then be efficiently processed in order to correct the captured image in a step 33.

Based on these color-based correction information items, it is then easy to infer whether or not the captured image is affected with white balance deviation by applying one of the known prior art methods based on color intensity data for an image. In other words, while in the prior art the data concerning all pixels in an image were taken into account, here the same type of correction information is obtained, meaning color correction information, but based on only a dynamically determined and selected number of pixels.

In particular, one can determine three correction information items Info-correct (k), where k represents the color blue, the color red, or the color green, according to the following equation.

$$\text{Info-correct}(k) = \left(\sum_{i=1}^{N_k} I_{pixel_i\text{-}select(k)}\right) / N_k$$

where $I_{pixel_i\text{-}select}$ corresponds to the intensity value associated with the selected pixel of index i; k corresponds to one of the colors blue, green, or red; and $N_k$ is the number of selected pixels which have the associated color indicator k.

Using these three correction information items, which correspond to average intensities obtained by color, an algorithm can then be applied based on the previously cited gray world theory.

Advantageously, the pixel selection criteria according to an embodiment of the present invention can be dynamically modified during the application of a correction process as described above.

In particular, one can modify the number of neighboring pixels taken into consideration in the selection step 31, as described above. One can also modify the criterion for determining whether two light intensity values are close in the sense of the present invention.

When too few pixels are selected in the step 31 with characteristics representative of a white balance deviation if there is one within the captured image, this selection criterion can advantageously be expanded to allow, for example, a higher percentage value around the light intensity value of the considered pixel.

The light intensity threshold value criterion for taking a pixel into consideration can also be modified dynamically.

Figure 4:
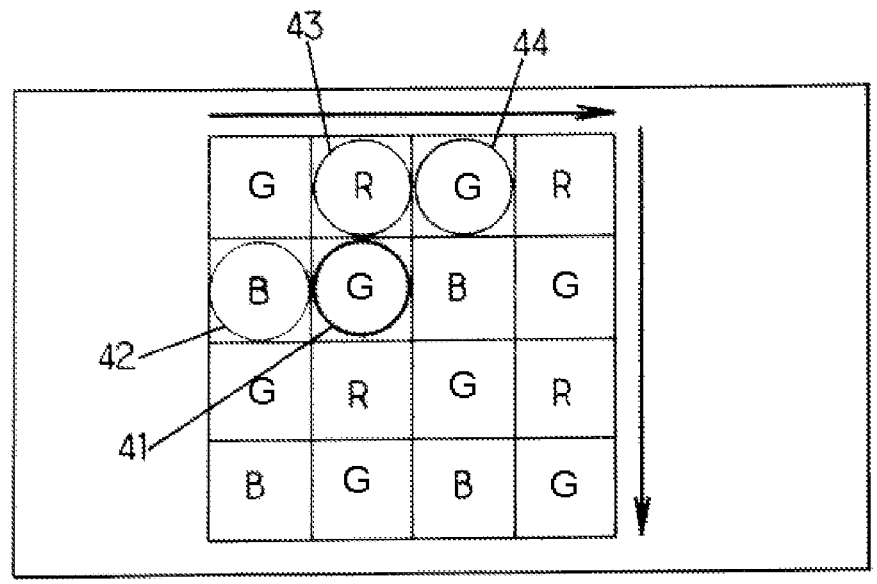
FIG. 4 illustrates pixel selection according to an embodiment of the present invention.

FIG. 4 illustrates pixel selection in an embodiment of the present invention. In the step 31, the pixels of the image illustrated in FIG. 2 can be scanned in chronological order, meaning from left to right and from top to bottom. During the step 31, a pixel 41 in the second row of pixels is scanned as a candidate for possible selection because the light intensity value associated with it is greater than the intensity threshold value. Here three neighboring pixels of this pixel 41 are considered, as N is equal to 3 here. This means considering the three pixels preceding the pixel 41 in the eight pixels which surround the pixel 41.

In this example, the pixel 41 is associated with a color indicator that indicates green. Therefore the step checks whether the two other colors are associated with at least two of the three neighboring pixels 42, 43 and 44 taken into consideration in one embodiment of the present invention.

Such is the case, because the color blue is associated with the neighboring pixel 42 and the color red is associated with the neighboring pixel 43. Before definitively selecting this pixel 41, it still needs to be determined wither the light intensity values respectively associated with the neighboring pixels 42 and 43 are close to the light intensity value associated with the pixel 41 itself, in the sense of an embodiment of the present invention.

If such is the case, the pixel 41 is then selected and its characteristics will then be used for determining the correction to be applied to the current image.

One can note that in the example illustrated in FIG. 4, if the number N of neighboring pixels to be taken into consideration in the step 31 is 2 and the neighboring pixels are the two preceding the considered pixel 41, meaning the neighboring pixels 44 and 42, then the pixel 41 may not be selected. In this case, the set of pixels constituted by the considered pixel, or the scanned pixel, and the two neighboring pixels 44 and 42 does not represent the three colors red, green and blue, and therefore does not meet the pixel selection criterion in an embodiment of the present invention.

Figure 5:
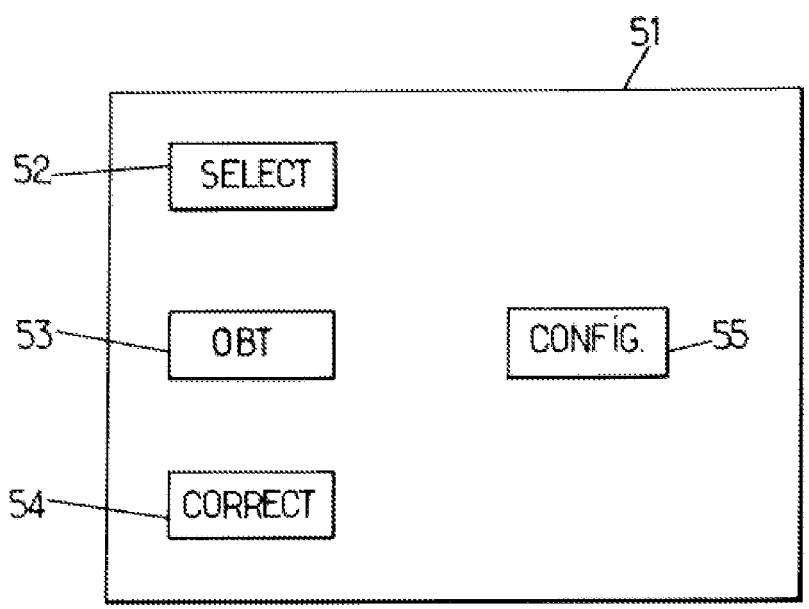
FIG. 5 illustrates an image correction device in accordance with an embodiment of the present invention.

FIG. 5 illustrates an image correction device according to an embodiment of the present invention.

Such a correction device 51 for an image captured by an image sensor according to an embodiment comprises:

a pixel selection unit 52 adapted to scan at least a part of the pixels in the captured image and to select each scanned pixel having at least one associated light intensity value greater than an intensity threshold value, on the basis of a comparison of at least one color indicator associated with the scanned pixel and at least one other color indicator associated with at least one pixel from among at least one neighboring pixel of the scanned pixel and the scanned pixel;

an information obtaining unit 53 adapted to obtain a first, a second, and a third correction information item by summing the light intensity values associated with the pixels respectively selected by color indicator; and a correction unit 54 adapted to determine a correction of the white balance deviation affecting the captured image, on the basis of the first, second, and third correction information items.

The selection unit 52 can additionally be adapted to select a scanned pixel, if it has at least two neighboring pixels with respectively associated color indicators that are both different from each other and different from the color indicated by the color indicator associated with the pixel.

This selection unit 52 can be adapted to select a scanned pixel if the difference between the light intensity values associated with the at least two neighboring pixels and the light intensity value associated with the scanned pixel is less than a difference threshold value.

The correction device 51 can additionally comprise a configuration unit 55 adapted to modify the difference threshold value and/or the intensity threshold value and/or the number N of neighboring pixels, as a function of the number of pixels selected.

When each of the pixels is associated with first, second, and third color indicators and with associated light intensity values for the respective color indicators, the selection unit can be adapted to select pixels further on the basis of a comparison between the light intensity values for the respective color indicators, associated with the scanned pixel.

While there has been illustrated and described what are presently considered to be the preferred embodiments of the present invention, it will be understood by those skilled in the art that various other modifications may be made, and equivalents may be substituted, without departing from the true scope of the present invention. Additionally, many modifications may be made to adapt a particular situation to the teachings of the present invention without departing from the central inventive concept described herein. Furthermore, an embodiment of the present invention may not include all of the features described above. Therefore, it is intended that the present invention not be limited to the particular embodiments disclosed, but that the invention include all embodiments falling within the scope of the appended claims.

What is claimed is:

1. A method for correcting an image captured by an image sensor, the captured image comprising a plurality of pixels, each of the pixels being associated with first, second, and third color indicators and with light intensity values for each of the color indicators, the method comprising the steps of:

scanning at least a part of the pixels in the captured image and selecting each scanned pixel having at least one associated light intensity value greater than an intensity threshold value, on the basis of a comparison between the light intensity values for the respective color indicators associated with the scanned pixel;

obtaining first, second, and third correction information items by summing the light intensity values associated with the pixels respectively selected by color indicator; and determining a correction of the white balance deviation affecting the captured image, on the basis of the first, second, and third correction information items, wherein in the scanning step, a scanned pixel is selected only if the difference between a mean light intensity value for the color indicators associated with the scanned pixel and a lowest light intensity value for the color indicators associated with the scanned pixel is less than a difference threshold value, and the difference between a highest light intensity value for the color indicators associated with the scanned pixel and the mean light intensity value for the color indicators associated with the scanned pixel is less than the difference threshold value.

2. The method according to claim 1, wherein the difference threshold value is modified as a function of the number of pixels selected.

3. The method according to claim 1, wherein the intensity threshold value is modified as a function of the number of pixels selected.

4. A correction device for an image captured by an image sensor, the image comprising a plurality of pixels, each of the pixels being associated with first, second, and third color indicators and with light intensity values for each of the color indicators, the correction device comprising:

a pixel selection unit adapted to scan at least a part of the pixels of the captured image and to select each scanned pixel having at least one associated light intensity value greater than an intensity threshold value, based on a comparison between the light intensity values for the respective color indicators associated with the scanned pixel;

an information obtaining unit adapted to obtain first, second, and third correction information items by summing the light intensity values associated with the pixels respectively selected by color indicator; and a correction unit adapted to determine a correction of the white balance deviation affecting the captured image, on the basis of the first, second, and third correction information items, wherein the pixel selection unit selects a scanned pixel only if the difference between a mean light intensity value for the color indicators associated with the scanned pixel and a lowest light intensity value for the color indicators associated with the scanned pixel is less than a difference threshold value, and the difference between a highest light intensity value for the color indicators associated with the scanned pixel and the mean light intensity value for the color indicators associated with the scanned pixel is less than the difference threshold value.

5. The correction device according to claim 4, further comprising a configuration unit adapted to modify at least one of the difference threshold value and the intensity threshold value as a function of the number of pixels selected.

6. A camera comprising the correction device according to claim 4.

7. A mobile telephone comprising the camera according to claim 6.

8. A non-transitory computer-readable storage medium encoded with a computer program for correcting an image captured by an image sensor, the captured image comprising a plurality of pixels, each of the pixels being associated with first, second, and third color indicators and with light intensity values for each of the color indicators, the computer program containing instructions for performing the steps of:

scanning at least a part of the pixels in the captured image and selecting each scanned pixel having at least one associated light intensity value greater than an intensity threshold value, on the basis of a comparison between the light intensity values for the respective color indicators associated with the scanned pixel;

obtaining first, second, and third correction information items by summing the light intensity values associated with the pixels respectively selected by color indicator; and determining a correction of the white balance deviation affecting the captured image, on the basis of the first, second, and third correction information items, wherein in the scanning step, a scanned pixel is selected only if the difference between a mean light intensity value for the color indicators associated with the scanned pixel and a lowest light intensity value for the color indicators associated with the scanned pixel is less than a difference threshold value, and the difference between a highest light intensity value for the color indicators associated with the scanned pixel and the mean light intensity value for the color indicators associated with the scanned pixel is less than the difference threshold value.

9. The non-transitory computer-readable storage medium according to claim 8, wherein at least one of the intensity threshold value and the difference threshold value is modified as a function of the number of pixels selected.

10. A method for correcting an image captured by an image sensor, the captured image comprising a plurality of pixels, each of the pixels being associated with a color indicator and with a light intensity value for the color indicator, the method comprising the steps of:

scanning at least a part of the pixels in the captured image and selecting each scanned pixel whose associated light intensity value is greater than an intensity threshold value;

obtaining first, second, and third correction information items by summing the light intensity values associated with the selected pixels by color indicator; and determining a correction of the white balance deviation affecting the captured image, on the basis of the first, second, and third correction information items, wherein in the scanning step, a scanned pixel is selected only if:
  there are at least two neighboring pixels with associated color indicators that are both different from each other and different from the color indicated by the color indicator associated with the scanned pixel, and
  the difference between the light intensity values associated with the at least two neighboring pixels and the light intensity value associated with the scanned pixel is less than a difference threshold value, and
at least one of the difference threshold value and the intensity threshold value is modified as a function of the number of pixels selected.

11. The method according to claim 10, wherein the difference threshold value is modified as a function of the number of pixels selected.

12. The method according to claim 11, wherein the difference threshold value is dynamically modified during the image correction process.

13. The method according to claim 10, wherein the intensity threshold value is modified as a function of the number of pixels selected.

14. The method according to claim 10, wherein in the scanning step, the at least two neighboring pixels are selected from a number N of neighboring pixels of the scanned pixel, where N is a whole number between 2 and 8.

15. A correction device for an image captured by an image sensor, the image comprising a plurality of pixels, each of the pixels being associated with a color indicator and with a light intensity value for the color indicator, the correction device comprising:

a pixel selection unit adapted to scan at least a part of the pixels of the captured image and to select each scanned pixel whose associated light intensity value is greater than an intensity threshold value;

an information obtaining unit adapted to obtain first, second, and third correction information items by summing the light intensity values associated with the selected pixels by color indicator;

a correction unit adapted to determine a correction of the white balance deviation affecting the captured image, on the basis of the first, second, and third correction information items; and a configuration unit adapted to modify at least one of the difference threshold value and the intensity threshold value as a function of the number of pixels selected, wherein the pixel selection unit is adapted to select a scanned pixel only if:
  there are at least two neighboring pixels with associated color indicators that are both different from each other and different from the color indicated by the color indicator associated with the scanned pixel, and
  the difference between the light intensity values associated with the at least two neighboring pixels and the light intensity value associated with the scanned pixel is less than a difference threshold value.

16. The correction device according to claim 15, wherein the configuration unit adapted to modify the difference threshold value as a function of the number of pixels selected.

17. The correction device according to claim 15, wherein the configuration unit adapted to modify the intensity threshold value as a function of the number of pixels selected.

18. The correction device according to claim 15, wherein the pixel selection unit is adapted to select the at least two neighboring pixels from a number N of neighboring pixels of the scanned pixel, where N is a whole number between 2 and 8.

19. A camera comprising the correction device according to claim 15.

20. A mobile telephone comprising the camera according to claim 19.

* * * * *